Dec. 20, 1932.　　　J. A. MAURER, JR　　　1,891,387
FILM PHONOGRAPH
Filed Oct. 28, 1931　　　3 Sheets-Sheet 1

INVENTOR
JOHN A. MAURER JR.
BY
ATTORNEY

Dec. 20, 1932.  J. A. MAURER, JR  1,891,387
FILM PHONOGRAPH
Filed Oct. 28, 1931  3 Sheets-Sheet 2

INVENTOR
JOHN A. MAURER Jr.
BY
ATTORNEY

Dec. 20, 1932. J. A. MAURER, JR 1,891,387
FILM PHONOGRAPH
Filed Oct. 28, 1931 3 Sheets-Sheet 3
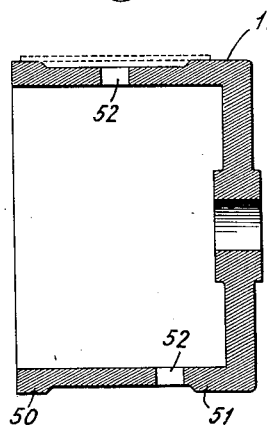
Fig. 3
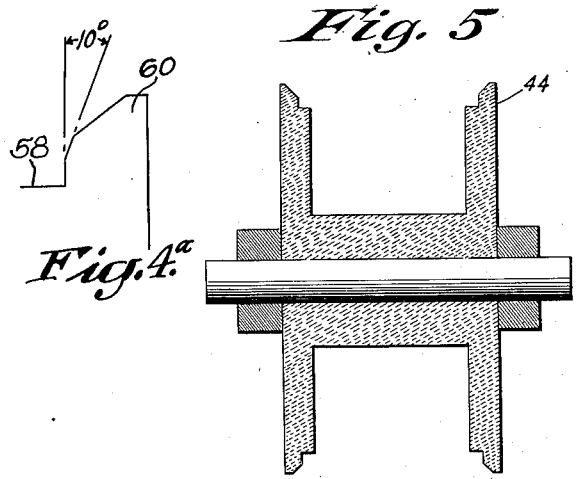
Fig. 4ª Fig. 5
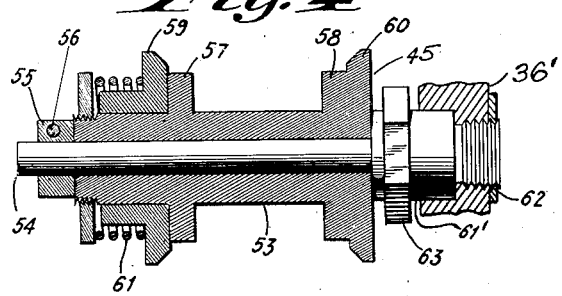
Fig. 4
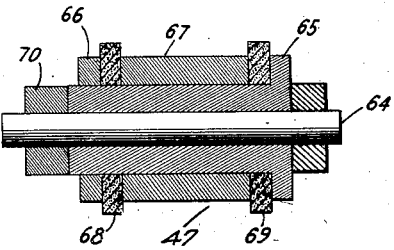
Fig. 6
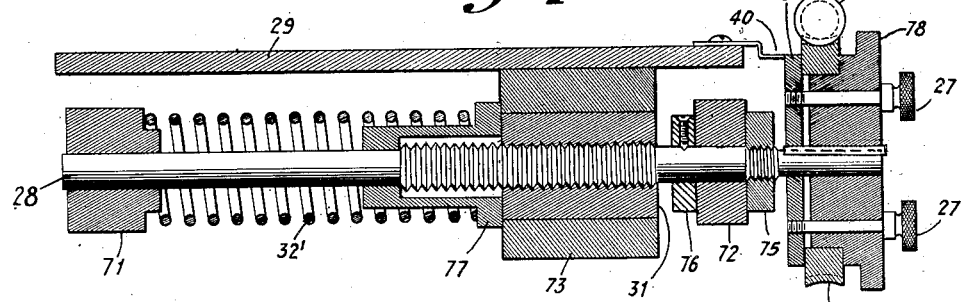
Fig. 7
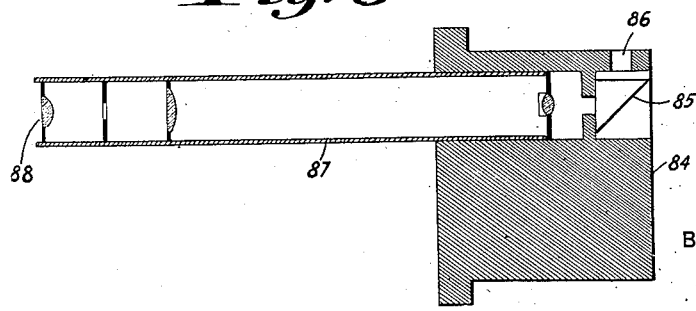
Fig. 8
INVENTOR
JOHN A. MAURER JR.
BY
ATTORNEY Patented Dec. 20, 1932

1,891,387

UNITED STATES PATENT OFFICE

JOHN A. MAURER, JR., OF NEW YORK, N. Y., ASSIGNOR TO RADIO CORPORATION OF AMERICA, A CORPORATION OF DELAWARE

FILM PHONOGRAPH

Application filed October 28, 1931. Serial No. 571,532.

This invention relates to the recording of sound and has for its principal object the provision of an improved sound recorder suitable for the production of sound records of the micro-photographic type. While specific data on the construction of a practical form of the apparatus are given, it will be apparent that the invention is not limited to this particular form.

The particular recorder herein described is designed to produce a photographic sound record in the form of a helix on a continuous loop or belt of film. The dimensions of the record track are almost microscopic; that is, of a width of the order of two thousandths of an inch. The spacing from center to center of the adjacent turns of the helical sound track is of the order of four thousandths of an inch.

In the recording of sound the film is driven entirely by friction and in order to produce the helical sound record the optical system is moved across the width of the film by a lead screw which is in a fixed geared relation to the film driving surface, so that the film advances a definite distance for each foot of film carried past the recording point. The use of sprockets in the drive mechanism is entirely avoided.

The problems involved in the construction of a recording apparatus of this type are the provision of means for driving the film at a definite and uniform speed, the provision of means for guiding the film so that it is maintained in a definite lateral position, and appreciable side weave is prevented at the point where it passes the recording optical system, the provision of means for maintaining the film surface at an exact distance from the recording optical system across its entire width so that the recording image is kept in extremely critical focus, the provision of means for protecting the recording surface of the film from abrasion, the provision of means for moving the optical system of the recorder across the film at a predetermined rate and with a degree of accuracy such that the maximum error of position at any time is small in comparison with the width of the sound track, and the provision of means for insuring that the helical sound track is started at a predetermined distance from the edge of the film.

The manner in which these various problems are solved, and the objects of the invention are realized, will be better understood from the following description when considered in connection with the accompanying drawings. The scope of the invention will be pointed out in the appended claims.

Referring to the drawings:

Fig. 3 is a sectional view of the drum over which the film is passed in juxtaposition to the objective of the optical system;

Figs. 4, 4a, 5 and 6 show various features of the different rollers over which the film passes;

Fig. 7 illustrates the driving mechanism of the optical system; and

Fig. 8 illustrates a form of device arranged to cooperate with the drum of Fig. 3 for focusing the light image at the surface of the film.

Figure 1:
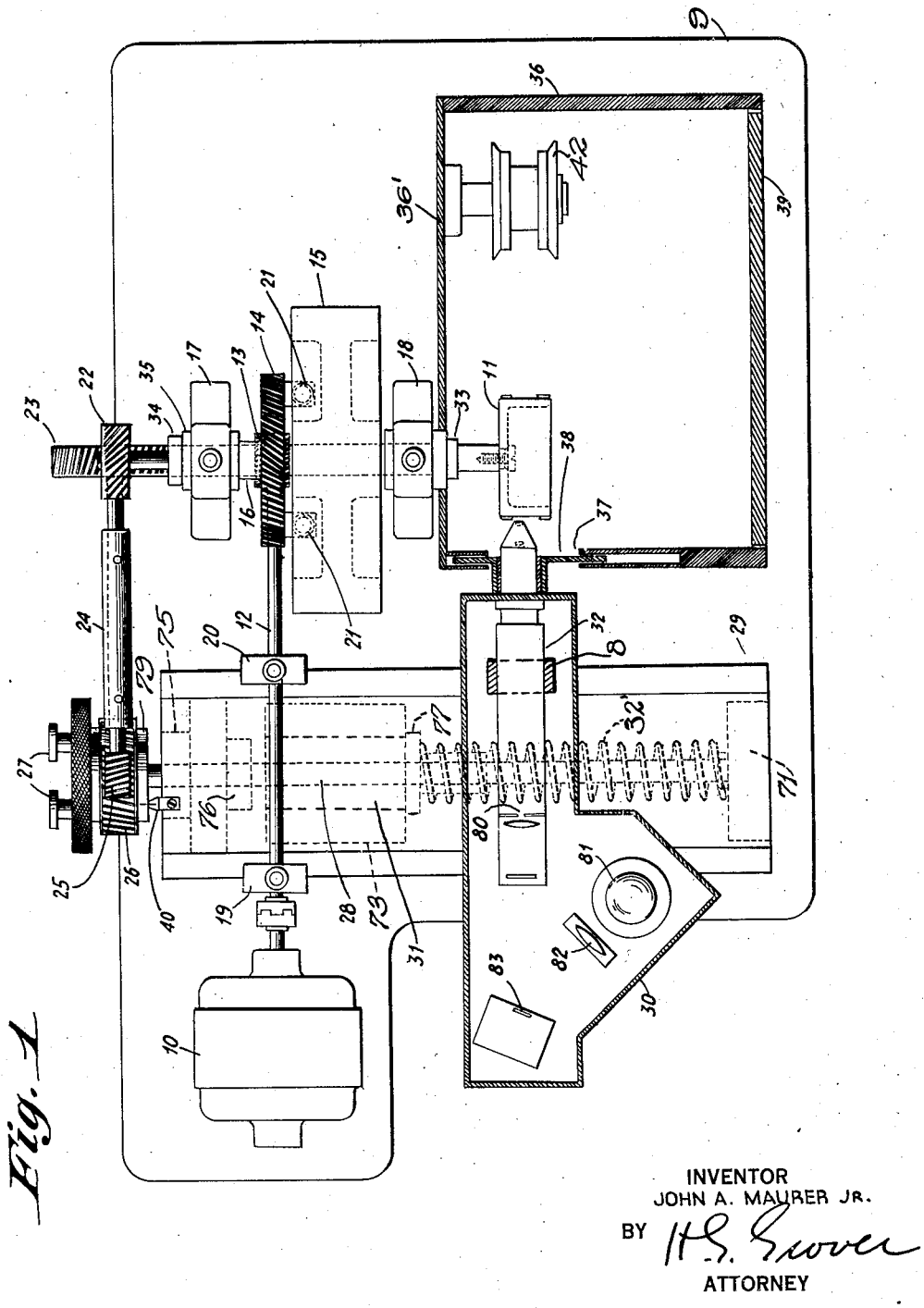
Fig. 1 illustrates partly in section a recording apparatus wherein the invention has been embodied.

The apparatus illustrated in Fig. 1 includes a motor 10 which may be of the three-phase type and which is coupled to a film drum 11 through a shaft 12, a worm 13, a worm wheel 14 and a flywheel 15 mounted on a shaft 16, which is supported in bearings 17 and 18. It should be noted that the shaft 12 is provided with bearings 19 and 20 mounted on a base 9 which supports the other parts of the apparatus, and that the worm wheel 14 is arranged to float on or turn freely about the shaft 16, and is coupled to the flywheel 15 through resilient connections 21 which may assume any suitable form such as that described by United States Patent 1,728,304. As will be readily understood, the spring linkage between the worm wheel 14 and the flywheel 15 constitute a mechanical filter which prevents the transmission to the shaft 16 on which the film drum 11 is mounted, of irregularities in speed caused by inaccurate cutting of the gears and the like.

Mounted upon the shaft 16 at the end opposite to that on which the film drum 11 is mounted, is a gear 22 arranged to cooperate with a gear 23 mounted on a shaft 24 which is substantially parallel with the shaft 12 and is provided at its opposite end with a worm gear 25 in cooperative relation with a gear 26. The gear 26 is arranged to rotate loosely about its bearing, a clutch member provided with screws 27 being provided for the purpose of connecting it to a shaft or lead screw 28 through which the table 29 and the recording element 30 mounted on this table are driven.

The table 29 is movable in a dove tail bearing 6—7 (see Fig. 2) and is moved in this bearing in response to rotation of the screw 28 which cooperates with the nut 31 mounted in the bracket 73 on its under side.

Mounted on the under side of the table 29 is a nut 31 which meshes with the lead screw 28 for effecting movement of the objective of the optical system 32 across the film at the desired speed, which in the particular apparatus illustrated is four thousandths of an inch for each four and one-half feet of film movement. The action of the lead screw 28 in moving the table 29 is opposed by a powerful coil spring 32' which is provided for the purpose of eliminating the effect of any looseness between the lead screw 28 and the nut 31 which would tend to produce inaccuracy in the movement of the optical system. As a further precaution, the lead screw 28 is arranged to push the table 29 in a direction which compresses the spring during the recording operation. In order to return the table to its starting position the clutch at the end of the lead screw 28 is loosened by means of the screws 27, and the lead screw is rotated either manually or automatically to return the table to the proper starting point. An indicating member 40 mounted on the table may be arranged to cooperate with an indicating mark on the clutch mechanism for insuring that the table is returned to the same point after each recording operation. The various details of the clutch and indicating mechanism are indicated in further detail in Fig. 7 hereinafter described.

For the purpose of preventing weave or sidewise movement of the film as it passes the objective of the optical system 32, a shoulder 33 and an adjustable screw collar 34 which bears against the end of the bronze bushing 35 within which the shaft 16 turns, are provided. By suitable adjustment of the collar 34 any appreciable end play of the shaft is eliminated.

The film drum 11 is surrounded by a light tight enclosure 36 which is provided with an opening 37 through which the objective of the optical system 32 is inserted, this insertion being made through a felt line jacket 38 mounted in a double slide arrangement which permits free movement of the optical system in a direction parallel with the shaft 16, and serves to exclude light from the enclosure 36. In order to permit film threading and observation of the parts mounted within the enclosure 36, a door 39 is provided.

Figure 2:
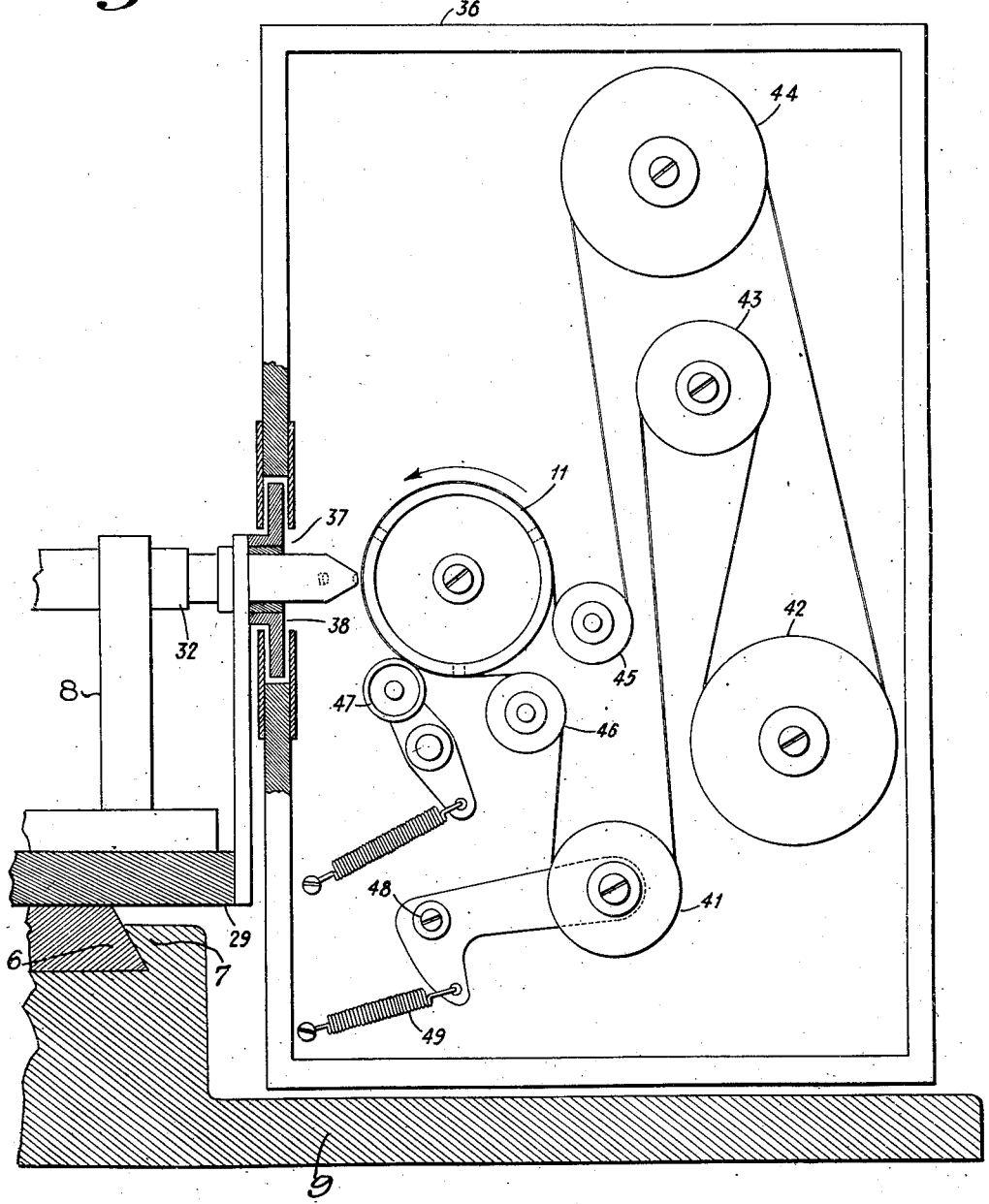
Fig. 2 is an elevation partly in section showing the arrangement of the film supporting rollers, the cabinet which encloses these rollers and the optical system through which recording is effected.

As indicated in further detail by Fig. 2, the mechanism mounted within the enclosure 36 includes the drum 11 and idlers 41 to 46 over which the film passes, the idlers 45 and 46 serving to guide the film on to and off of the drum 11. As previously pointed out in connection with Fig. 1, the drum 11 is driven through the flywheel 15. Near the point at which the film leaves the drum 11 it is passed under a rubber-tired roller 47 which is spring pressed against the drum for the purpose of preventing slippage between the drum and the film. The idler 41 is pivoted at 48 and pressed against the film by means of a spring 49 which permits it to float in the slack end of the film loop. Thus the film is maintained under a definite tension throughout the entire system. If the various idlers turn freely on their bearings it has been found that this tension will hold the film in driving contact with the drum so that substantially no slippage occurs. The rubber-tired pressure roller 47 serves to prevent any possible slippage of the film on the drum. The construction of the various idlers and the rubber-tired roller are shown in greater detail in Figs. 4 and 6 hereinafter described.

A suitable construction of the drum 11 is shown in Fig. 3. It will be noted that the driving surfaces 50 and 51 are not provided with flanges, and that the central portion is recessed about ten one-thousandths of an inch to prevent contact with the film on the portion where sound is to be recorded. The position of the film is indicated by dotted lines. It has been found by experience that when a film is wrapped around the flange drum in the manner indicated, under a sufficient amount of tension which is not extremely critical, its surface will become truly cylindrical so that its line of intersection with the light beam from the optical system is a straight line. This insures that the recording image is in exact focus against the entire width of the film even though the film is unsupported at its central portion. A number of openings 52 are provided in the recessed portion of the drum to permit inspection of the recording image on the film by a microscope placed inside the drum. The construction of this microscope is indicated in Fig. 8 hereinafter described.

Fig. 4 shows the details in the construction of the guide rollers or idlers 45 and 46. These rollers comprise a member 53, which is arranged to run without appreciable end play on a shaft 54, being held in its illustrated position by a collar 55 which is split and contracted on the shaft by a screw 56. This construction has the advantage that it readily lends itself to delicate adjustment. The film supporting surfaces 57 and 58 touch the film only at the edges not used for the record. The edges of the film are held between the shoulders 59 and 60, and are forced by a spring 61 in such a direction as to hold the film tightly against the shoulder 60. As indicated by the drawings, the shoulders 59 and 60 are tapered at an angle of about ten degrees except for a short distance above the film bearing surfaces, where, for a distance approximately ten thousandths of an inch, they are flat and perpendicular to the axis of rotation. This construction has the advantage that it permits the film to enter the guide rollers and seat firmly against the perpendicular bearing surfaces. The spring 61 provides compensation for slight differences in film width. The surface 61' fits into an opening in the supporting plate on which the guide roller is mounted, and serves to maintain the roller shaft accurately perpendicular to the supporting plate. The screw thread 62 engages a female thread in the supporting plate or wall 36', so that by turning the part 63 which is hexagonal, with a wrench, the spindle may be adjusted endwise, a locking nut being arranged to cooperate with the thread 62 for locking the idler in any desirable position.

It is apparent that the edges of the film are held in a definite position as it passes around the rollers 45 and 46. These two rollers are adjusted so that their solid guiding edges are the same distance from the supporting plate, the surface of which is perpendicular to the axis of the shaft 16 on which the drum 11 is mounted. As a result, the film travels around the drum in the same position, with no tendency to slip endwise. Thus the two guide rollers serve the purpose of maintaining the film in a definite position on the drum. It has been found that this position is maintained during the operation of the apparatus well within the permissible tolerance of .0002 of an inch.

The construction of the idlers 41 to 44 is indicated in Fig. 5. These idlers differ only in diameter. Their flanges are placed wide enough apart to receive the widest unshrunken film stock. As in the case of the guide rollers 45 and 46, they are arranged to contact with the film only on the edges beyond the recording area.

The constructional details of the rubber-tired roller 47 are shown in Fig. 6. This part of the apparatus includes a shaft 64 on which is mounted a bronze center piece 65 which has forced over it the two sleeves 66 and 67 whereby the rubber washers 68 and 69 are compressed. The outer surfaces of the rubber washers are ground to true concentricity with the bearing by a high speed carborundum cutting wheel or the like. The spacing between these washers is such that they cooperate with the driving surfaces of the drum and do not touch any part of the film used for the record. The collar 70 is provided for preventing end play of the roller.

The construction of the lead screw 28 and its associated parts is illustrated in Fig. 7. It will be noted that this screw is supported by massive bearings 71 and 72, that the nut 31 is arranged to cooperate with a threaded portion of the lead screw over a considerable length, and is ground to fit it after turning. This process averages the errors of the screw and gives a smoother and more accurate drive than would normally be obtained. The nut 31 is supported in a bracket 73 which in turn is supported by the table 29. For the purpose of preventing end play a threaded collar 75 is arranged to clamp a shoulder 76 tightly against the bearing 72. As previously indicated, the spring 32' prevents lost motion between the nut and the lead screw. At the left hand end of the nut 31 the collar 77 is provided for supporting the spring 32 and protecting the lead screw from dust and other foreign matter.

The operation of the clutch through which the shafts 28 and 16 are coupled together will be readily understood. It includes a member 78 which is fixed to the shaft 28 and a member 79 which is arranged to be clamped to the gear 26 by means of the screws 27. The index member 40 carries a mark which can be used in conjunction with a mark on the member 79 to establish a definite starting position of the recording operation. When the screws 27 are tightened, the table 29 of course begins to move to the left from the starting point, thus insuring that the helical record is begun at a predetermined distance from the edge of the film.

The optical system of the recorder 30 may be of any suitable form. In order to render it suitable for recording of extremely narrow sound tracks, the objective lens should have a focal length of the order of four millimeters, and the distance between the objective lenses and the mechanical slit 80 (see Fig. 1) should be greater than is used in present sound motion picture recorders. This results in the imaging of the fixed slit on the film at a ratio of the order of sixty to one instead of four to one as is usual in commercial recorders of this type. Because of the small depth of focus of the short focus objective lens it is necessary to provide a focusing movement of considerably greater delicacy than that customarily provided. The recorder 31 (see Fig. 1) is diagrammatically indicated as of the galvanometer variable area type, light from a source 81 being projected through a lens 82 to the galvanometer mirror 83, from it is reflected into the optical element 32. Since recorders of this type are well known to those skilled in the art, a detailed description of it is believed to be unnecessary.

Fig. 8 illustrates a microscopic device which is adapted to be inserted in the drum 11 for the purpose of focusing the light image on the film. This device is provided with a block 84 which fits inside the drum 11, and with a prism 85 by which light entering through the openings 52 of the drum 11 and an opening 86 of the member 84 is reflected through a microscope 87 to the eyepiece 88. The microscope may be equipped with a 32 mm. objective and a 10 times ocular. This microscope is focused through the prism and hole 86 on the film surface, which may be scratched with fine emery in order to give distinct marks for focusing. The recording image is then brought into sharp focus while watching its appearance through the microscope. By following this method it has been found that an extremely precise focus can be obtained.

Attention is called to the fact that the broader aspects of the frictionally driven film and movable optical system combination are covered in a copending application Serial No. 571,533, filed October 28, 1931, and assigned to the same assignee as the present application.

Having thus described my invention and the operation thereof, what I claim is:

1. An apparatus for recording sound on a continuous loop of light sensitive film including frictional means for moving said film at a substantially uniform linear speed, and means for moving a recording light beam across said film at a rate of speed proportional to said linear speed.

2. An apparatus for recording sound on a continuous loop of light sensitive film including frictional means for moving said film at a substantially uniform linear speed, means including an optical system for producing a light beam modulated in accordance with the sound to be recorded, and means for moving said system laterally of said film at a speed dependent on said linear speed.

3. An apparatus for recording sound on a continuous loop of light sensitive film including frictional means for moving said film at a substantially uniform linear speed, means for producing a light beam modulated in accordance with the sound to be recorded, and means for moving said beam laterally of said film at a speed proportional to said linear speed.

4. An apparatus for recording sound on a light sensitive film arranged in the form of a continuous loop including a frictional drive roller for moving said film, means including an optical system for producing a light beam modulated in accordance with the sound to be recorded, and a mechanical coupling interposed between said roller and said system for moving said beam laterally of said film.

5. An apparatus for recording sound on a light sensitive film arranged in the form of a continuous loop including a frictional drive roller for moving said film, means including an optical system for producing a light beam modulated in accordance with the sound to be recorded, and means positively geared to said roller for moving said system laterally of said film.

6. An apparatus for recording sound on a light sensitive film arranged in the form of a continuous loop including a frictional drive roller for moving said film, means including an optical system mechanically coupled to said roller for producing a light beam modulated in accordance with the sound to be recorded, and means for disconnecting said system from said roller to permit its return to a predetermined starting position.

7. Apparatus for recording sound on a light sensitive film arranged in the form of a continuous loop including frictional means for driving said film, means for producing a light beam modulated in accordance with the sound to be recorded, means for moving said light beam laterally across said film at a speed proportional to the movement of said film, and means arranged to permit said beam to be moved independently of said film.

8. Apparatus for recording sound on a light sensitive film including a roller arranged to drive said film through frictional contact, means for driving said roller, inertia means fixed to said roller, a resilient coupling interposed between said driving and inertia means, means for producing a light beam modulated in accordance with the sound to be recorded, and means interposed between said roller and said beam producing means for moving said beam across said film at a speed proportional to the surface speed of said roller.

9. Apparatus for recording sound on a light sensitive film including a roller arranged to drive said film through frictional contact, means for driving said roller, inertia means fixed to said roller, a resilient coupling interposed between said driving and inertia means, means for producing a light beam modulated in accordance with the sound to be recorded, a resilient member, and means interposed between said roller and said beam producing means for moving the latter against the pressure of said member laterally of said film.

10. Apparatus for recording sound on a light sensitive film including means for driving said film through frictional contact, means for producing a light beam modulated in accordance with the sound to be recorded, coupling means interposed between said film driving and beam producing means for moving said light beam laterally of said film at a speed proportional to the speed of said film, means arranged to permit independent movement of said beam to a predetermined point, and means for indicating when said point is reached.

11. Apparatus for recording sound on a light sensitive film including means for driving said film through frictional contact, means for producing a light beam modulated in accordance with the sound to be recorded, coupling means interposed between said film driving and beam producing means for moving said light beam laterally of said film at a speed proportional to the speed of said film, and resilient means arranged to be controlled by movement of said beam producing means for eliminating irregularity in said beam movement.

JOHN A. MAURER, Jr.